United States Patent [19]  
Ueda et al.

[11] 4,389,855  
[45] Jun. 28, 1983

[54] DUAL AIR-CONDITIONER FOR MOTOR-CARS

[75] Inventors: Toshimichi Ueda; Akira Tezuka, both of Katsuta; Seiichi Wakairo, Kasama; Moriyuki Sakuma, Katsuta; Masashi Mochizuki, Tokyo, all of Japan

[73] Assignee: Hitachi, Ltd., Tokyo, Japan

[21] Appl. No.: 290,107

[22] Filed: Aug. 5, 1981

[30] Foreign Application Priority Data

Aug. 8, 1980 [JP] Japan .................................. 55-108292

[51] Int. Cl.³ .............................................. F25B 5/00
[52] U.S. Cl. ........................................ 62/200; 62/206; 62/217
[58] Field of Search .................. 62/199, 200, 217, 206

[56] References Cited
U.S. PATENT DOCUMENTS 2,155,516 4/1939 Tull et al. ..................... 62/206 X
2,215,947 9/1940 Wile ............................. 62/206 X
3,456,455 7/1969 Sapir ............................... 62/223
3,987,642 10/1976 Portoso et al. ................ 236/84 X Primary Examiner—William E. Wayner
Attorney, Agent, or Firm—Antonelli, Terry & Wands

[57] ABSTRACT

Disclosed is a dual air-conditioner for cars comprising an electromagnetic valve disposed in a refrigerant passage immediately downstream an outlet of an auxiliary evaporator for controlling the cross-sectional area of the passage, and an internal pressure balancing type expansion valve disposed in the refrigerant passage immediately upstream an inlet of the auxiliary evaporator. The passage cross-sectional area is controlled by the electromagnetic valve to control the pressure prevailing in the refrigerant passage between the expansion valve and electromagnetic valve so that the opening of the expansion valve is varied to regulate the flow rate of the refrigerant flowing into the auxiliary evaporator to thereby control the temperature of blow-off cooled air from the auxiliary evaporator.

4 Claims, 4 Drawing Figures

4,389,855

DUAL AIR-CONDITIONER FOR MOTOR-CARS

BACKGROUND OF THE INVENTION

1. Field of the Invention

This invention relates to a dual air-conditioner for motor-cars with a temperature control device and particularly contemplates temperature control of blow-off air cooled by an auxiliary evaporator installed in a trunk compartment of the car.

2. Description of the Prior Art

A dual air-conditioner for a motor-car has a main evaporator and an auxiliary evaporator which are typically respectively installed in an instrument panel and in a trunk compartment of the car.

It has been known, in order to control the temperature of blow-off air cooled by the main evaporator, to control re-heating of the cooled air passed through the main evaporator.

However, it is undesirable to heat again the air cooled by the auxiliary evaporator in order to control the temperature of the cooled blow-off air because it leads to a bulky temperature control device.

SUMMARY OF THE INVENTION

An object of the invention is to provide a dual air-conditioner for motor-cars with a temperature control device which is simplified for temperature control of blow-off air cooled by an auxiliary evaporator.

To accomplish the above object, according to the invention, an electromagnetic valve is disposed in a refrigerant passage immediately downstream an outlet of the auxiliary evaporator for controlling the cross-sectional area of the passage, and an internal pressure balancing type expansion valve is disposed in the refrigerant passage immediately upstream an inlet of the auxiliary evaporator. The pressure in the refrigerant passage between the expansion valve and the electromagnetic valve is controlled by controlling the passage cross-sectional area by means of the electromagnetic valve so that the opening of the expansion valve is varied to control the flow rate of the incoming refrigerant to the auxiliary evaporator.

DESCRIPTION OF THE PREFERRED EMBODIMENT

Figure 1:
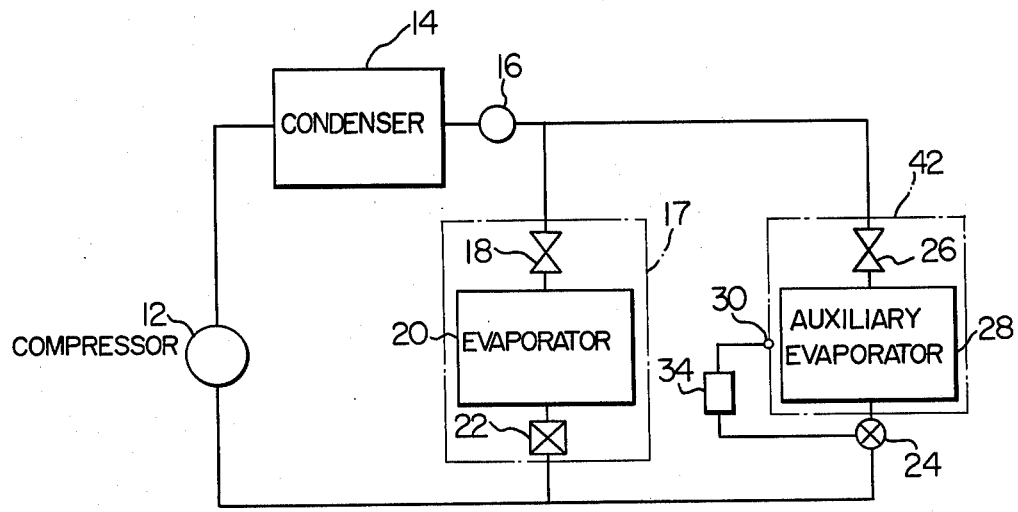
FIG. 1 is a block diagram to explain the outline of refrigerating cycle in a car dual air-conditioner with a temperature control device embodying the invention.

Reference is now made to FIG. 1 which is illustrative of the refrigerating cycle in a car dual air-conditioner with a temperature control device according to the invention. A compressor 12 has an exhaust port connected in series with a condenser 14 and a liquid receiver 16, and a main unit 17 is connected in parallel with a sub-unit 42 between a suction port of the compressor 12 and the downstream side of the liquid receiver 16. The main unit 17 consists of a series connection of an expansion valve 18, an evaporator 20, and an evaporating pressure control valve 22. The sub-unit 42 consists of an internal pressure balancing type expansion valve 26 connected with a downstream pipe of the liquid receiver 16, and an auxiliary evaporator 28 connected to the valve 26. An electromagnetic valve 24 is inserted between the downstream of the auxiliary evaporator 28 and the suction port of the compressor 12. A temperature sensor 30 mounted on the auxiliary evaporator 28 delivers an output which is fed to the electromagnetic valve 24 through an amplifier 34.

Figure 2:
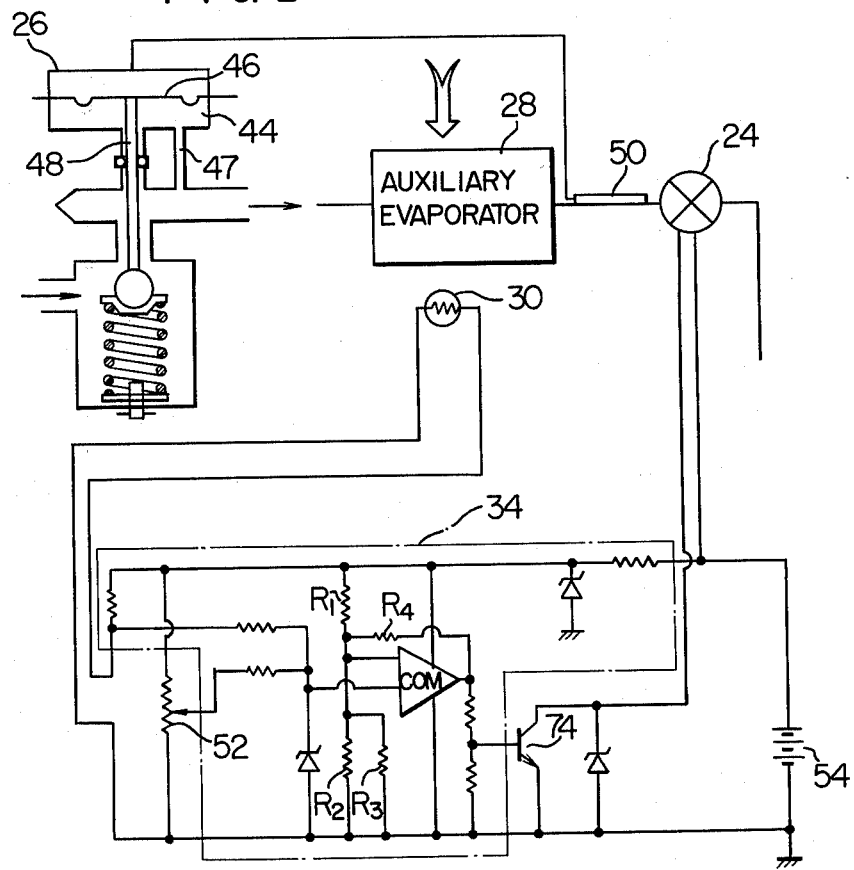
FIG. 2 shows details of the temperature control device shown in FIG. 1 and associated with an auxiliary evaporator.

FIG. 2 illustrates the connection between the sub-unit 42 and the electromagnetic valve 24 in greater detail.

The internal pressure balancing type expansion valve 26 has a valve rod 48 secured to a diaphragm 46 supported within a pressure balancing chamber 44. The pressure balancing chamber 44 is connected to a thermosensitive tube 50 disposed downstream of the auxiliary evaporator 28. A temperature setting variable resistor 52 is connected to the amplifier 34 to which the temperature sensor 30 is also connected. The electromagnetic valve 24 is fed from a power source 54.

Figure 3:
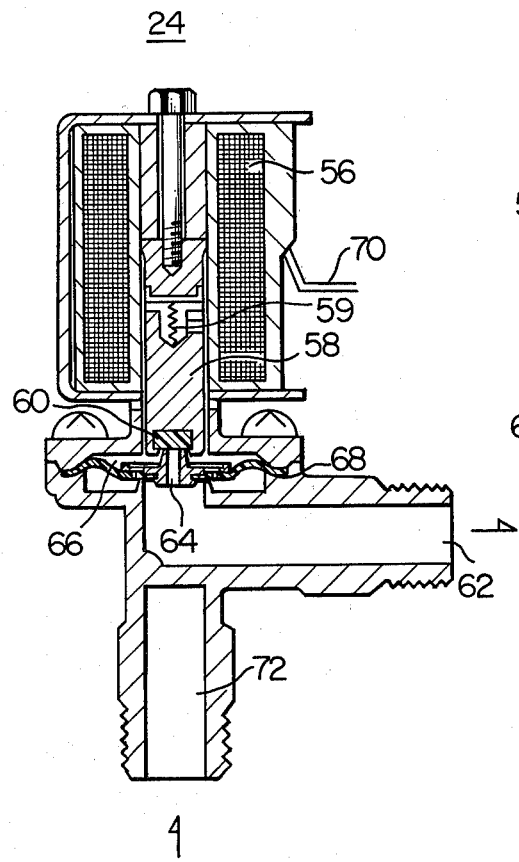
FIG. 3 is a side sectional view of an electromagnetic valve shown in FIG. 2.
Figure 4:
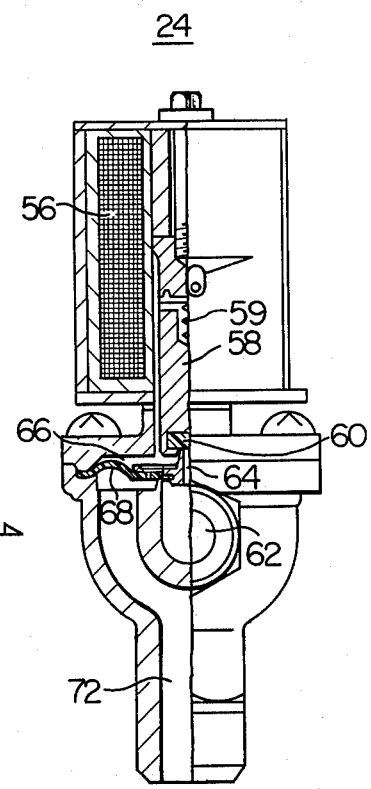
FIG. 4 is a front sectional view of the electromagnetic valve of FIG. 3.

FIGS. 3 and 4 illustrate details of the electromagnetic valve 24 as mentioned above.

A core 58 is slidably mounted in a coil 56 and provided at its one end with a packing 60. This packing 60 opposes a pilot port 64 which communicates with an outlet port 62. A partition wall in the form of a bellows frame 68 is provided in a pressure balancing chamber 66.

When the coil 56 is excited from the power source 54 through lead conductors 70, the core 58 is attracted upward against the downward urging force of a spring 59, thereby opening the pilot port 64. When the pilot port 64 is opened in process of a refrigerating cycle, a differential pressure develops across a main passage 72 and the pressure balancing chamber 66. As a result, the bellows frame 68 moves upwards to open the main passage 72. Then, a coolant or refrigerant is allowed to pass through an inlet port or the main passage 72 toward the outlet port 62 as shown by an arrow. With closure of the electromagnetic valve 24, the above operation is reversed. Owing to the pilot port 64 provided for the electromagnetic valve, the packing seal can be effected by the core 58 with a small force and hence the attraction force to be generated by the coil 56 may be small.

The operation of this embodiment will now be described.

One of a pair of input terminals of a comparator COM is supplied with a fixed voltage from the power source in accordance with a voltage division ratio determined by parallel resistors $R_2$ and $R_3$ and a resistor $R_1$ connected in series therewith.

As the resistance of the temperature sensor 30 varies upon the detection of the temperature of air passed through the auxiliary evaporator 28 and cooled thereby, the input signal applied to the other input terminal of the comparator COM varies correspondingly.

When the temperature of blow-off cooled air is decreased to a predetermined value, the output of the comparator COM assumes a "low" level to turn off a transistor 74.

With the transistor 74 being turned off, the coil 56 of the electromagnetic valve 24 is disconnected from supply of power, so that the core 58 is pushed downwards by the downward urging force of the spring 59 to thereby close the main passage 72.

Then, the pressure prevailing in the upstream of the electromagnetic valve 24 is raised, so that the pressure acting on the diaphragm 46 through a pressure balancing channel 47 rises to push the valve rod 48 upwards, thereby closing the refrigerant passage completely.

During a period through which the passage is blocked by the expansion valve 26 and electromagnetic valve 24, the pressure prevailing in the auxiliary evaporator 28 gradually increases owing to a thermal load exerted upon the auxiliary evaporator 28.

Consequently, the pressure acting on the diaphragm 46 by way of the pressure balancing channel 47 of the expansion valve 26 is increased to further push up the valve rod 48 in the valve closure direction.

On the other hand, the temperature of air which has passed through the auxiliary evaporator 28 rises gradually. When the air temperature rises to a predetermined value at which the resistance of the temperature sensor 30 reaches a predetermined value, the output of the comparator COM is inverted to "High" level to thereby turn on the transistor 74.

With the transistor 74 being turned on, the supply of power to the coil 56 of the electromagnetic valve 24 is established so that the core 58 is pushed upwards, thereby opening the main passage 72.

Then, the pressure prevailing upstream of the electromagnetic valve 24 is decreased under the influence of the suction pressure to the compressor 12. Consequently, the pressure acting on the diaphragm 46 by way of the pressure balancing channel 47 of the expansion valve 26 is also decreased and hence the diaphragm 46 pushes down the valve rod 48 to open the refrigerant passage.

In this manner, air passing through the auxiliary evaporator 28 is re-cooled and the electromagnetic valve 24 is kept opened before the temperature of the cooled air again reaches the predetermined value, in order to ensure that the flow rate of refrigerant is controlled by the expansion valve 26 in accordance with temperature and pressure of the refrigerant.

Since the temperature setting variable resistor 52 is connected in parallel with the temperature sensor 30, the varying characteristics of the input signal to the comparator which vary due to variations in the resistance of the temperature sensor 30 can be changed by adjusting the variable resistor 52, thus ensuring that the inverting operation of the comparator COM due to temperature variations can be effected at a desired timing.

More particularly, as the movable arm of the variable resistor 52 is moved upward in FIG. 2, the rate of variations of the input signal to the comparator COM due to the variations in resistance of the temperature sensor 30 becomes larger so that the output of the comparator COM can be inverted with a slight change in temperature of the cooled air detected by the temperature sensor 30.

Conversely, as the movable arm of the variable resistor 52 is moved downward in FIG. 2, the rates of variations of the input signal to the comparator COM due to the variations in resistance of the temperature sensor 30 becomes smaller, so that the output of the comparator COM can be inverted only with a greater change in temperature of cooled air detected by the temperature sensor 30.

In this way, the timings for opening and closing of the electromagnetic valve 24 can be changed by adjusting the movable arm of the variable resistor 52 so as to control the desired temperature of blow-off cooled air from the auxiliary evaporator 28.

It will be appreciated that the output of the comparator COM is fedback to the reference voltage terminal of the comparator through a resistor $R_4$ to cause a difference between the timing for generation of an open-signal for the electromagnetic valve 24 and the timing for generation of a close-signal for the same, thereby preventing hunting of the electromagnetic valve 24 which would be caused in the proximity of the preset temperatures from occurring.

As described above, according to the invention, the electromagnetic valve 24, disposed downstream of the auxiliary evaporator 28, is opened or closed to vary the opening of the internal pressure balancing type expansion valve 28, so that the temperature of blow-off air from the auxiliary evaporator 28 can be controlled. The electromagnetic valve 24, adapted to change the opening of the internal pressure balancing type expansion valve 26, is not always required to be closed completely and a small stroke of the electromagnetic valve 24 suffices.

In accordance with the foregoing embodiment wherein the electromagnetic valve 24 is disposed downstream of the auxiliary evaporator 28 and opened/closed in response to the temperature of blow-off air from the auxiliary evaporator 28 to control the internal pressure balancing type expansion valve 26 for ultimate control of the flow rate of incoming refrigerant to the auxiliary evaporator 28, it is possible to arrange the electromagnetic valve 24 in a low pressure side so as to dispense with the use of expensive, high-pressure electromagnetic valves. Further, it becomes possible to simplify the packing seal so as to provide an inexpensive dual air-conditioner with a temperature control device.

Since the temperature control of blow-off air from the auxiliary evaporator mainly depends on mere opening and closing operations of the electromagnetic valve 24, the temperature control device can be simplified in construction and freed from erroneous operations, thus improving the reliability thereof.

As it has become apparent from the above description, according to present invention, an internal pressure balancing type expansion valve 26 and an electromagnetic valve 24 are respectively disposed at the upstream and downstream side of an auxiliary evaporator 28 so as to make it possible to use an inexpensive electromagnetic valve and to provide a car dual air-conditioner with a temperature control device improved in its reliability.

What is claimed is:
1. A dual air-conditioner comprising:
 compressor means for compressing and exhausting a refrigerant gas for a refrigerating cycle;
 condenser means for liquidizing the compressed refrigerant gas from said compressor;
 expansion means for subjecting the refrigerant liquid from said condenser to adiabatic expansion so as to cause the refrigerant liquid to be in the form of mist;
 evaporator means for subjecting the refrigerant in the form of mist from said expansion means to heat exchange with air so as to cool the air and for returning the refrigerant gas having experienced the heat exchange to said compressor means;
 said evaporator means including a main evaporator and an auxiliary evaporator connected by piping in parallel with each other;

said expansion means including a first expansion unit provided in a first upstream piping of said main evaporator and a second expansion unit provided in a second upstream piping of said auxiliary evaporator, said second expansion unit being an expansion valve of an internal pressure balancing type;

an electromagnetic valve provided in a first downstream piping of said auxiliary evaporator at a portion of said first downstream piping between said first auxiliary evaporator and a junction between said first downstream piping and a second downstream piping of said main evaporator; and means for controlling the opening of said electromagnetic valve in accordance with the operation state in the refrigerating cycle so as to control balancing pressure acting on said internal pressure balancing type expansion valve to thereby control the flow rate of the refrigerant flowing into said auxiliary evaporator, said controlling means comprises a temperature sensor for detecting the temperature of blow-off cooled air from said auxiliary evaporator, a control circuit for controlling an opening and closing of said electromagnetic valve in accordance with an output of said temperature sensor including difference setting means for setting a predetermined difference for the open and close operation of the electromagnetic valve and for adjusting output characteristics of said temperature sensor.

2. A dual air-conditioner according to claim 1, wherein said temperature sensor generates an output voltage in accordance with a temperature of blow-off cooled air from said auxiliary evaporator, and wherein said controlling means further comprises a comparator for comparing the output voltage of said temperature sensor with a reference voltage, and said difference setting means includes a variable resistor connected in parallel with said temperature sensor so as to manually control the output voltage characteristics of said temperature sensor to thereby control the opening of said electromagnetic valve in accordance with the output of said comparator.

3. A dual air-conditioner according to claim 2, wherein said electromagnetic valve comprises a pilot actuator valve.

4. A dual air-conditioner for cars comprising:

compressor means for compressing and exhausting a refrigerant gas for a refrigerating cycle;

condenser means for liquidizing the compressed refrigerant gas from said compressor;

expansion means for subjecting the refrigerant liquid from said condenser to adiabatic expansion so as to cause the refrigerant liquid to be in a form of mist;

evaporator means for subjecting the refrigerant in the form of mist from said expansion means to heat exchange with air so as to cool the air and for returning the refrigerant gas having experienced the heat exchange to said compressor means;

said evaporator means including a main evaporator and an auxiliary evaporator connected by piping in parallel with each other;

said expansion means including a first expansion unit provided in a first upstream piping of said main evaporator and a second expansion unit provided in a second upstream piping of said auxiliary evaporator, said second expansion unit being an expansion valve of an internal pressure balancing type;

an electromagnetic valve comprising a pilot actuator valve provided in a first downstream piping of said auxiliary evaporator at a portion of said first downstream piping between said auxiliary evaporator and a junction between said first downstream piping and a second downstream piping of said evaporator; and means for controlling the opening of said electromagnetic valve in accordance with the operation of state in the refrigerating cycle so as to control balancing pressure acting on said internal pressure balancing type expansion valve to thereby control the flow rate of the refrigerant flowing into said auxiliary evaporator, said control means comprises a temperature sensor for detecting the temperature of blow-off cooled from said auxiliary evaporator, a control circuit for controlling the opening of said electromagnetic valve in accordance with an output of said temperature sensor, and means for adjusting output characteristics of said temperature sensor.

* * * * *